United States Patent [19]

Douglass

[11] Patent Number: 4,859,486
[45] Date of Patent: Aug. 22, 1989

[54] PREPARATION OF AN UNCOOKED SUNFLOWER SEED FOODSTUFF

[76] Inventor: John M. Douglass, 1526 N. Edgemont St., Los Angeles, Calif. 90027

[21] Appl. No.: 100,117

[22] Filed: Sep. 23, 1987

Related U.S. Application Data

[63] Continuation-in-part of Ser. No. 846,469, Mar. 31, 1986, abandoned, which is a continuation of Ser. No. 486,713, Apr. 20, 1983, abandoned.

[51] Int. Cl.[4] ............................ A23L 1/36; A23B 9/00
[52] U.S. Cl. .................................... 426/629; 426/459; 426/460; 426/804; 426/808; 426/810
[58] Field of Search ............... 426/629, 459, 460, 804, 426/808, 810

[56] References Cited

U.S. PATENT DOCUMENTS

| | | | |
|---|---|---|---|
| 1,152,132 | 8/1915 | Vartanian | 426/629 |
| 3,567,465 | 3/1971 | Knechtel | 426/629 |
| 4,088,795 | 5/1978 | Goodnight et al. | 426/629 X |
| 4,515,818 | 5/1985 | MacDonald et al. | 426/629 X |
| 4,595,576 | 6/1986 | Fazzolare | 426/629 X |

*Primary Examiner*—David M. Naff
*Attorney, Agent, or Firm*—Lyon & Lyon

[57] ABSTRACT

An uncooked sunflower seed foodstuff is prepared from soaked, rinsed and sprouted raw, shelled sunflower seeds. The sprouted seeds by themselves, or with such nutritional or flavoring additives desired (such as raisins), are ground into a dough. This dough is formed into a flat shape and submitted to ambient or mildly heated air drying until thoroughly dried. The resultant product is palatable, filling, nutritious and life supporting.

19 Claims, No Drawings

PREPARATION OF AN UNCOOKED SUNFLOWER SEED FOODSTUFF

BACKGROUND OF THE INVENTION

This application is a continuation-in-part of Ser. No. 846,469, filed Mar. 31, 1986, which has a continuation of Ser. No. 486,713, filed Apr. 20, 1983, both of which are now abandoned.

1. The field of Invention

The invention herein pertains to a method for preparing foodstuffs and the resultant product. More particularly, it pertains to a method for processing sunflower seeds into a readily edible, digestible, nutritious uncooked form and the product of that process.

2. Prior Art

Uncooked foods are, of course, the oldest type of food known to man. It is safe to say that for many years man survived eating only uncooked foods. As man became more civilized, however, so did his diet. Today, the vast majority of modern man's diet is heat-processed and laden with additives—natural and otherwise.

Recently, the medical profession has begun to link many ailments to diet, and particularly to the excessive processing of, and additives to, the food we eat. For example, several forms of cancer, in particular cancer of the colon, are now thought to be closely related to the food we eat. Many of the coronary problems faced by so many people today are thought attributable, at least in part, to diet. Similarly, diabetes, high blood pressure, obesity, and the other medical ailments attendant thereto are also thought to be, at least in part, attributable to diet. Certainly, marked improvements in patients suffering from these and other ailments have been noted after the patient is placed on a restricted, high-percentage-uncooked diet. In addition to those people who seek or are prescribed a more natural diet for specific health reasons, there has been a recent and growing belief, primarily amongst the younger generation, that living on a natural, raw diet is nature's intention. Therefore, there are an increasing number of people who utilize raw foods as a substantial, and in many instances, total part of their diet.

In many of these diet, fruits, nuts and vegetables play a predominant role. For example, the typical uncooked products found on the health food store shelves will be a variety of raw fruit, seeds and nuts. A few are mixtures held together by honey, raw sugar, raisins, dates and/or figs; or mixtures of fruit and fruit juices. Although these produce tasty food, they contain many ingredients which produce detrimental side effects and cannot be tolerated by certain people. Many fruits and fruit juices ferment and produce alcohol in the gut, raise the blood sugar and triglyceride level in the blood, and cause general weakness in the patient. Various nuts cause allergies in many people, and many vegetables contain toxins that interfere with proper mental function. Additionally, some individuals on such a raw diet have exhibited signs of increased tooth decay, undesired weight loss, cessation of menstruation in women, and loss of libido. Some of the individuals who embark upon a self-choice raw diet without the counsel of a qualified dietician or doctor, in addition to these specific maladies, can suffer from general poor health and an increased susceptibility to illness.

It is believed that these undesirable side effects are primarily attributed to the fact that it is very difficult to obtain sufficient amounts of digestible protein and other necessary nutrients in the typical raw diet. Also, many of the foods which are used in the typical raw diet can themselves produce detrimental side effects.

This led the Inventor to search for a food that was a good source of protein and other nutrients, which food could be ingested without cooking, yet was tasty, had no adverse side effects, had good shelf life, was portable and improved the health of the consumer.

Starting in 1971, first tested were meat, fowl, fish and shellfish. These were rejected for several reasons, taste and health being primary. Next, various dairy products, such as milk and cheese, were tested. Although these were tasty and a good source of protein, they were rejected for health reasons and because they required refrigeration and did not have a good shelf life. Eggs were also rejected for similar reasons.

Grains were investigated next. It was found that by soaking wheat, then grinding it into a paste, mashing it in a pie press, and sun drying the result, a tortilla-like bread could be made. This wheat bread, however, was not sufficiently high in protein, nor was it sufficiently portable or edible as a monodiet to be useful. Other grains were also tested, but proved unsatisfactory for taste and/or health reasons.

The search for a simple, tasty, portable, wholly nutritious uncooked food led next to legumes (peas, beans and lentils), which were processed in different ways without cooking. The legumes, however, are not very tasty without cooking, are not sufficiently nutritious, and produce some unwanted side effects.

After discarding legumes, nuts of various kinds and in various combinations were tested. These were quite tasty, but were rejected for health and allergy reasons.

The search then led to seeds (sesame, pumpkin, squash and sunflower). The sesame seed was rejected because of health reasons. Pumpkin and squash seeds were rejected because of bioincompatibility. Of all the raw foods tested, the sunflower seed seemed to be the best candidate to serve as the basis for preparing an uncooked food that met the above-enumerated criteria.

It had been well known in the art that the seed of the sunflower had good nutritional characteristics. The sunflower seed is very high in protein, B vitamins and essential oils, but is very low in sugar. It was also known that the sunflower seed contains plant sterols which stimulate sex hormone production in vegetarians who suffer from a lowered testosterone level resulting from a purely vegetarian diet. The drawback previously encountered with sunflower seeds has been not so much in the nutritional components of the seed itself (although raw sunflower seeds do pose some health problems, as will be discussed infra), but in the mechanical problem of ingesting them. Therefore, sunflower seeds had not previously been investigated as a sole food source.

Sunflower seeds were first tested simply by eating large handfuls of the seeds. This has a tendency, however, to cause throat irritation, and in some patients, can cause oral paresthesias. Furthermore, although sunflower seeds are among the least toxic of all raw foods, they contain some quantities of phytate, which is known to inhibit the assimilation in the body of certain mineral nutrients. Also, when sunflower seeds are eaten whole, they are generally not chewed well enough to be fully assimilated. Therefore, excessive quantities would have to be eaten to obtain sufficient nutrition therefrom. Another drawback encountered with raw, whole sunflower seeds is that the seed membrane on each seed is high in phosphorous. Accordingly, ingesting large amounts of raw, whole sunflower seeds would increase the intake of phosphorous. Many nutritionists recommend lower phosphorous levels in the diet. Accordingly, simply eating handfuls of sunflower seeds was unsatisfactory.

Grinding the seeds and sprinkling them on salads and other foods, and making sauces and dressing from the seeds were tried next. Ground sunflower seeds, however, are not universally palatable. This also was not sufficiently portable, and the ground meal still posed the phosphorous and phytate problems.

It was noticed when working with the ground sunflower seed meal that adding a small amount of water to the meal made a dough. Pieces of this dough could be pinched off and hand formed into wafers which, when air dried, produced a somewhat tasty, albeit a little dry, wafer. This wafer avoided the problems of improper indigestion which resulted from chewing whole seeds, but was still not completely satisfactory. First, the phosphorous content of the seed membrane still posed a health risk and a protease inhibitor was still present. Second, the wafers were somewhat difficult to prepare. Third, although very edible, the wafers were not sufficiently tasty such that they could compete with the heavily sugared cookies and candies that were the staple of many diets.

To avoid the phosphorous problem, the seeds were soaked to remove many of the seed membranes. This helped with the phosphorous problem, but this meant that the old way of simply grinding whole dry seeds and adding a small amount of water would not work anymore. Also, the resultant dough was very sticky and difficult to handle, such that forming the wafers was difficult. This product was also still unsatisfactory because the sunflower seeds contained a protease inhibitor which restricted the body's ability to assimilate the seed's protein and other nutrients. Accordingly, to reduce the protease inhibitor, the seeds were sprouted before grinding, as sprouting reduces the amount of protease inhibitor in the seeds. This proved problematic, however, as the sprouting process led to a number of undesirable results. First, the length of the sprout was found to have unexpected impact on the resultant product. If the sprouts were longer than one-fourth inch, the product turned brown and had an unpleasantly sharp and earthy taste. If the sprouts were not more than one-fourth inch, the resultant product was white or golden colored, and more pleasing to the taste. Also, sprouting without molding (i.e., fungus growth) was very difficult to achieve.

In sum, developing a raw foodstuff that was inexpensive, highly nutritious in and of itself, tasty and easy to produce and store, yet would not have the unpleasant side effects typically associated with raw foods, was quite difficult.

SUMMARY OF THE INVENTION

The invention herein described and claimed provides such a foodstuff and a method for its production. Raw, uncooked, hulled sunflower seeds are first thoroughly soaked in water, then drained and rinsed to remove some of the outer membranes on the seeds. The seeds are then sprouted, preferably until the sprout is not more than one-fourth inch in length, with care being exercised to insure the seeds do not mold in the process. The sprouted seeds are then ground into a dough. Pieces of the dough are next formed into a relatively thin shape and dehydrated at approximately 100° to 130° F. The result of this process is a palatable uncooked foodstuff, high in digestible protein, but low in toxicity, and without most of the deleterious substances present in other uncooked foods.

Using himself as the guinea pig, the Inventor has remained in excellent health eating only his uncooked sunflower seed food and drinking green leaf tea for the last two years.

As additional steps to this process, supplements of zinc, magnesium, manganese and various vitamins, such as B12, can be added to the seeds prior to grinding. Additionally, natural foods (such as uncooked, organic raisins, fruits, berries, vegetables and herbs), food flavorings, and enzymes can be added prior to grinding to vary the taste of the resultant foodstuff.

In this way, a nutritious, uncooked, tasty foodstuff, resembling a cookie, is produced.

The product of this process is useful not only for those suffering from some malady requiring a special diet, but also to those people who simply desire a low animal fat, low sugar, low salt, high protein, high nutrition, health-improving food or snack for themselves or their children. It is a superb lightweight, life-supporting food for hikers, hunters, backpackers and the like, and has proven effective to support a healthy human existence.

DESCRIPTION OF THE PREFERRED EMBODIMENT

Raw, whole, hulled sunflower seeds are first thoroughly soaked, drained and rinsed to remove any unwanted impurities, and to remove the majority of the seed membranes. The cleansed seeds can either be placed in room temperature tap water, or simply kept moist, until the seeds are sprouted. Care should be exercised to insure that the seeds are sprouted only until the sprout itself is approximately one-fourth inch in length (as it has been discovered that excessively sprouted seeds produce a foodstuff of unpleasant color and uncomfortably hot to the taste), and to insure that the seeds sprout but do not mold (i.e., produce fungus growth). In this regard, it has been found that only whole seeds should be used and that seed fragments should be discarded before sprouting, as the fragments are more prone to molding. As the seeds absorb an abundance of water, a volume of water roughly equal to one and one-half the volume of seeds will be sufficient, and less water will, in some instances, suffice. It has been found that soaking the seeds or maintaining them moist for approximately 12-20 hours is adequate in order to sprout the seeds properly. The preferred method is to soak the seeds for approximately eight hours, then drain the seeds, but keep them in a cool place for another 10-12 hours, rinsing the seeds every 2 hours or so.

The sprouting of the seeds is important in that it has been found that this sprouting decreases the protease inhibitor to minimum quantities and increases vitamin content. It is desirous, however, to have some protease inhibitor present.

During the soaking and sprouting procedure, more of the shell membranes will loosen and can be removed by one or more vigorous rinsings. Additionally, the seeds can be soaked and washed in agitated water which will be more effective to remove the seed membranes which are high in phosphorus, and therefore undesirable.

After the seeds are thoroughly soaked, they should be given a final rinse and allowed to drain to eliminate excess water. However, it is not necessary, and it is undesired, to allow the seeds to drain for too great a period of time. Eight to ten minutes is typically sufficient.

In the preferred embodiment, uncooked organic raisins which have also been soaked in water are mixed together with the sprouted and rinsed sunflower seeds. (Commercially prepared raisins should be avoided as they have been subjected to high heat during processing.) The raisins and sprouted sunflower seeds are ground in any suitable mechanical device which will produce a dough. A regular kitchen-type food processor and a nutbutter maker have proven effective.

Prior to grinding the seeds, enzymes, nutritious foodstuffs (dried sprouts for example), vitamins and other nutrient supplements can also be added to the seeds. Such things as amylase, iron, zinc, manganese, magnesium, phytase and/or any of the vitamin or food supplements can be added in any desired dosage. When ground with the seeds, the supplements will be thoroughly mixed.

Flavoring, such as carob powder, tamari, miso, salt, herbs and other seasonings can also be added to the seeds before or during the grinding stage. This does not interfere with the processing or drying of the foodstuff, but can be used to vary the flavor and nutrient content of the resultant product. The foodstuff having carob powder added tastes much like chocolate, whereas the tamari and miso flavored product have a somewhat meat-like taste. Those with added salt taste much like salted sunflower seeds or salted chips. Any number of other herbs, flavorings can be added to obtain a number of tastes.

The resultant dough is then formed into any shape that may be quickly air dried. A flat shape characterized by "peaks" and "valleys" on one side so as to increase surface area has been found preferable. This shape can be easily made by using a regular kitchen fork to flatten a ball of the dough or to shape a slice of the dough. The crucial aspect here is to ensure that whatever shape the dough is formed into will air dry quickly, and will not be prone to interior molding which may have deleterious effects on persons ingesting same.

It has been found that the dough can be formed into long or short rolls of the desired diameter. Cookie shaped slices from the roll are easy to prepare and air dry. This forming and shaping of the dough can be done by hand or by conventional food processing apparatus currently available in the industry. If done by hand, it has been found that the rolls can be made more manageable by placing them into a refrigerator or freezer until they become cold, firm and easier to handle.

Thin slices may be cut from the rolls by use of a knife or any other suitable type of mechanical slicer. These slices are placed on a screen, perforated metal sheet or other suitable apparatus to allow for ambient air drying, although a fan and/or mild heat, around 100° to 130° F., may also help in cold or damp climates. The air drying, depending on atmospheric conditions, will take two to six days. In a 100° to 130° F. dehydrator, drying is typically completed in 12 to 18 hours. The drying process is complete when the product is firm and dry all the way through.

Although a precise description of the preferred embodiment is set forth above, it will be understood to those in the art that many modifications thereupon are possible, without departing from the inventive concepts hereinafter claimed. Accordingly, this patent and the protection provided hereby is not to be limited to the preferred embodiment, but is of the full scope of the appended claims.

What is claimed is:

1. A method for making an uncooked sunflower seed foodstuff, the method comprising the steps of
    (a) thoroughly soaking and rinsing raw, uncooked, hulled sunflower seeds to remove some of the outer membranes that are high in phosphorous on the seeds;
    (b) sprouting, said seeds;
    (c) grinding said seeds into a dough;
    (d) forming said uncooked dough into a shape such that said dough can be readily dried; and
    (e) drying, without cooking, said dough.
2. The method of claim 1 wherein said seeds are soaked in water not less than one hour, nor more than twenty-four hours.
3. The method of claim 1 wherein said seeds are sprouted until the sprout is not more than one-fourth inch in length.
4. The method of claim 1 wherein said seeds are sprouted by soaking said seeds for ten to twelve hours, then keeping the seeds moist by rinsing every two hours for another eight hours.
5. The method of claim 2 wherein said seeds are soaked in vigorously moving water.
6. The method of claim 2 wherein said water is repeatedly drained from said seeds, and said seeds are repeatedly rinsed.
7. The method of claim 2 wherein said dough is formed into a flat shape before drying.
8. The method of claim 2 wherein said dough is formed into a roll, said roll is cooled to a temperature where the dough is cold, firm and easier to handle, and slices are cut from said roll for drying.
9. The method of claim 1 wherein said dough is dried in ambient air.
10. The method of claim 1 wherein raisins are added to the seeds before grinding.
11. The method of claim 10 wherein said raisins are soaked in water before adding them to the seeds.
12. The method of claim 10 wherein said raisins are soaked for 1 to 2 hours, and said raisins are organically grown and uncooked.
13. The method of claim 1 wherein mild heat is applied to said dough to dry, but not cook it.
14. The method of claim 13 wherein said heat is about 100° to 130° F.
15. The product produced by the process of claim 1.
16. The product produced by the process of claim 3.
17. The product produced by the process of claim 7.
18. The product produced by the process of claim 10.
19. The product produced by the process of claim 13.

* * * * *